US012497236B2

(12) United States Patent
Rousseau

(10) Patent No.: US 12,497,236 B2
(45) Date of Patent: Dec. 16, 2025

(54) LOCKING DEVICE FOR A GARBAGE DISPOSAL BIN HAVING A FLIP UP LID

(71) Applicant: Michael Rousseau, St-Stanislas (CA)

(72) Inventor: Michael Rousseau, St-Stanislas (CA)

( * ) Notice: Subject to any disclaimer, the term of this patent is extended or adjusted under 35 U.S.C. 154(b) by 209 days.

(21) Appl. No.: 18/228,103

(22) Filed: Jul. 31, 2023

(65) Prior Publication Data

US 2024/0300733 A1 Sep. 12, 2024

(30) Foreign Application Priority Data

Mar. 8, 2023 (GB) .................................... 2211342

(51) Int. Cl.
*B65F 1/16* (2006.01)

(52) U.S. Cl.
CPC .................................. *B65F 1/1615* (2013.01)

(58) Field of Classification Search
CPC .................................................. B65F 1/1615
See application file for complete search history.

(56) References Cited

U.S. PATENT DOCUMENTS 2,559,072 A 7/1951 Hasselwander
3,844,597 A 10/1974 Elrod et al.
4,279,357 A * 7/1981 Robinson .............. B65F 1/1615 220/744
4,833,737 A 5/1989 Boucher et al.
5,094,358 A 3/1992 Serio, Sr.
5,373,959 A 12/1994 Hassewinkel
5,415,314 A 5/1995 McCollum
5,474,341 A 12/1995 Putnam et al.
5,599,050 A 2/1997 Tinsley
5,772,264 A 6/1998 Bettenhausen
6,041,960 A * 3/2000 Leal ...................... B65F 1/1615 292/288
6,880,717 B1 * 4/2005 O'Conor ............... B65F 1/1615 292/288
7,070,064 B1 * 7/2006 Henry ................... B65F 1/1623 220/908
9,284,117 B2 * 3/2016 Guild .................... E05D 13/006
9,821,957 B1 11/2017 Hurst
10,285,395 B1 * 5/2019 Ehrenberg ............ A01M 29/30
11,420,821 B2 * 8/2022 McDade ............... B65F 1/1615
2004/0065666 A1 * 4/2004 Walker .................. B65F 1/1615 220/318
2014/0306465 A1 10/2014 Kreitzer
2016/0159570 A1 6/2016 Reeb et al.
2016/0257491 A1 * 9/2016 Manssourian ........ B65F 1/1615
2017/0081119 A1 * 3/2017 Blazer ................... B65F 1/1615

(Continued)

*Primary Examiner* — Mark A Williams

(57) ABSTRACT

The present invention provides a locking device for a garbage disposal bin to prevent unwanted access by pests and exposure to weather conditions. The locking device includes a strap, a cord, and a rocker lever. The strap, attached to the front portion of the bin, includes a loop portion through which the cord passes. One end of the cord connects to a ring encircling a hinge portion of the bin, while the other end is releasably attached to the rocker lever. The rocker lever, made of resiliently deformable material, applies pressure on the cord to secure it in place, thus effectively locking the bin. This system offers a reliable locking solution that prevents unintentional lid opening, while still allowing for easy, efficient operation during garbage pickup and disposal activities.

9 Claims, 3 Drawing Sheets

(56) References Cited

U.S. PATENT DOCUMENTS

| | | | | |
|---|---|---|---|---|
| 2018/0105359 | A1 | 4/2018 | Chapman | |
| 2018/0208396 | A1* | 7/2018 | Schoonmaker ....... | B65F 1/1452 |
| 2021/0339947 | A1* | 11/2021 | Gause .................. | B65F 1/1615 |
| 2022/0380122 | A1* | 12/2022 | Martin, II ............ | B65F 1/1646 |

* cited by examiner

FIG. 2A
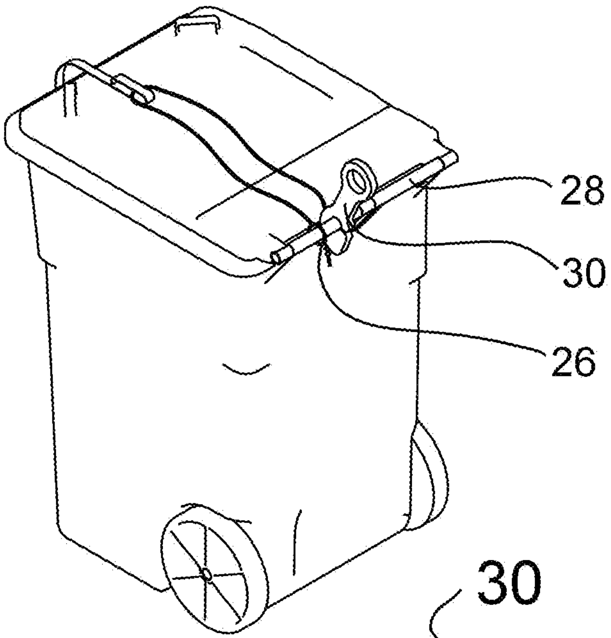
FIG. 2B
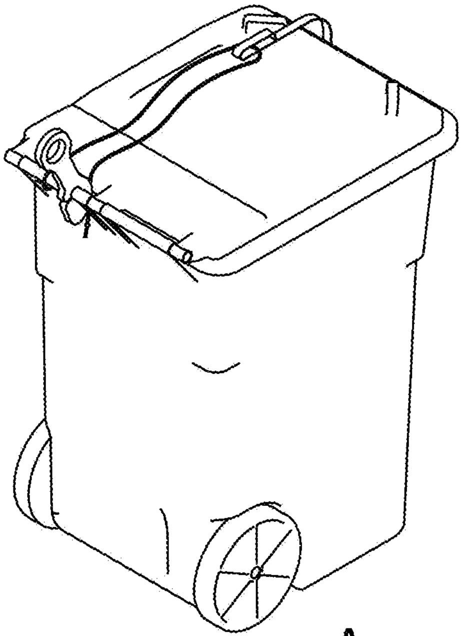
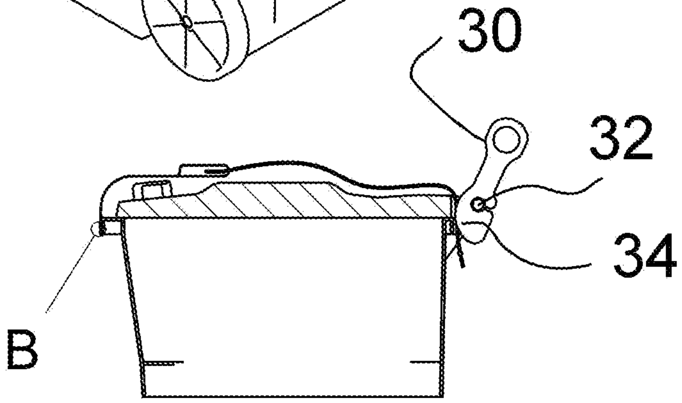
SECTION A-A
SCALE 1:15
FIG. 2C
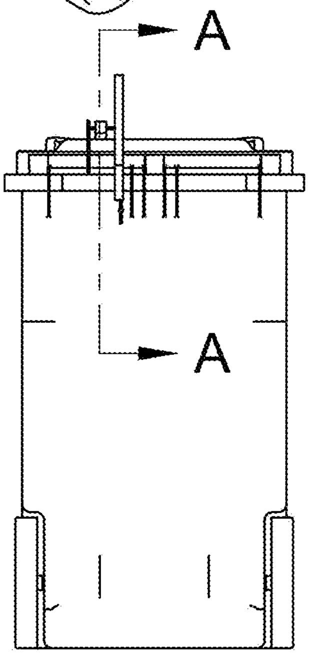
FIG. 2D

LOCKING DEVICE FOR A GARBAGE DISPOSAL BIN HAVING A FLIP UP LID

CROSS-REFERENCE TO RELATED APPLICATIONS

The present application claims priority to UK request 2211342.7 filed on Aug. 3, 2022, entitled "locking device for a garbage disposal bin having a flip up lid," the disclosure of which is hereby incorporated in its entirety at least by reference.

BACKGROUND OF THE INVENTION

1. Field of the Invention

The present invention relates to locking and securing devices but more particularly to a locking device for a garbage disposal bin having a flip up lid.

2. Description of Related Art

The issue with unlocked garbage bins is that, over extended periods, they become accessible to various pests such as rats, birds, raccoons, foxes, and other animals. These animals can easily lift the lid and reach inside for food. Additionally, strong winds may blow the lid open, scattering the trash.

Modern garbage bins are typically constructed from durable polymers, with a large, lightweight lid that is easy to lift, even for small animals like rats, or in windy conditions. There are numerous methods people employ to prevent the lid from opening, including placing a heavy weight on top, tying it down with string or a bungee-type elastic device, or using more drastic measures which modify the bin or lid assembly. However, these modifications can prevent the lid from opening properly when it is necessary, such as during garbage pickup. As some municipal pickups use an automatic lifting system, this system cannot unlock a complex lid locking mechanism, complicating the process for the garbage truck operators who must quickly figure out how to unlock the lid. These makeshift solutions are far from ideal, indicating room for improvement in this field. Furthermore, not all bins and lids, given their varying sizes and shapes, accommodate the simple installation of an aftermarket or universal locking device without additional modifications.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

It is a main object of the present invention to provide a locking device for a garbage disposal bin having a flip up lid.

In order to do so, in one aspect of the invention, a locking device for a garbage disposal bin having a flip up lid is provided, the locking device comprising: a strap, a cord, and a rocker lever, wherein the cord is releasably attached to the rocker lever, the strap includes a loop portion through which the cord passes, and the rocker lever applies pressure on the cord to secure it in place, thus locking the bin.

In one embodiment, the strap has a proximal end attached to a front portion of the bin. In another embodiment, the strap has a loop portion at its opposite end. In yet another embodiment, the cord has one end connected to a ring encircling a hinge portion of the bin and its opposite end releasably attached to the rocker lever. In a further embodiment, the rocker lever is made of a resiliently deformable material. In another embodiment, the rocker lever has an offset rotational axis wrapped around the hinge portion of the bin. In another embodiment, the cord is positioned on top of the lid and through the loop portion of the strap.

In another aspect of the invention, a method for operating a locking device for a garbage disposal bin having a flip up lid is provided, comprising the steps of: manipulating a rocker lever towards the front of the bin to disengage a cord; pulling the cord away from a loop portion and the lid of the bin; and opening the lid of the bin.

In one embodiment, the method further comprises closing the lid of the bin. In another embodiment, the method further comprises repositioning the cord back on top of the lid and threading it through the loop. In yet another embodiment, the method further comprises inserting the end of the cord between the bin and the rocker lever. In a further embodiment, the method further comprises pushing the rocker lever towards the back of the bin to lock the cord in place. In another embodiment, the strap is mechanically fastened to the bin, using a variety of mechanical means.

The foregoing has outlined rather broadly the more pertinent and important features of the present invention so that the detailed description of the invention that follows may be better understood and so that the present contribution to the art can be more fully appreciated. Additional features of the invention, which will be described hereinafter, form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF THE DRAWINGS

Other features and advantages of the present invention will become apparent when the following detailed description is read in conjunction with the accompanying drawings, in which:

FIG. 2A is a first rear isometric view of the present invention.

FIG. 2B is a second real isometric view of the present invention.

FIG. 2C is a sectional view of section A-A of FIG. 2D.

FIG. 2D is a rear view of the present invention.

DETAILED DESCRIPTION OF THE INVENTION

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein to specifically provide a locking device for a garbage disposal bin having a flip up lid.

It is to be understood that the terminology used herein is for the purpose of describing particular embodiments only and is not intended to be limiting. The terms "a" or "an," as used herein, are defined to mean "at least one." The term "plurality," as used herein, is defined as two or more. The term "another," as used herein, is defined as at least a second or more. The terms "including" and/or "having," as used herein, are defined as comprising (i.e., open language). The term "providing" is defined herein in its broadest sense, e.g., bringing/coming into physical existence, making available, and/or supplying to someone or something, in whole or in multiple parts at once or over a period of time. These terms generally refer to a range of numbers that one of skill in the art would consider equivalent to the recited values (i.e., having the same function or result). In many instances these terms may include numbers that are rounded to the nearest significant figure.

Figure 1:
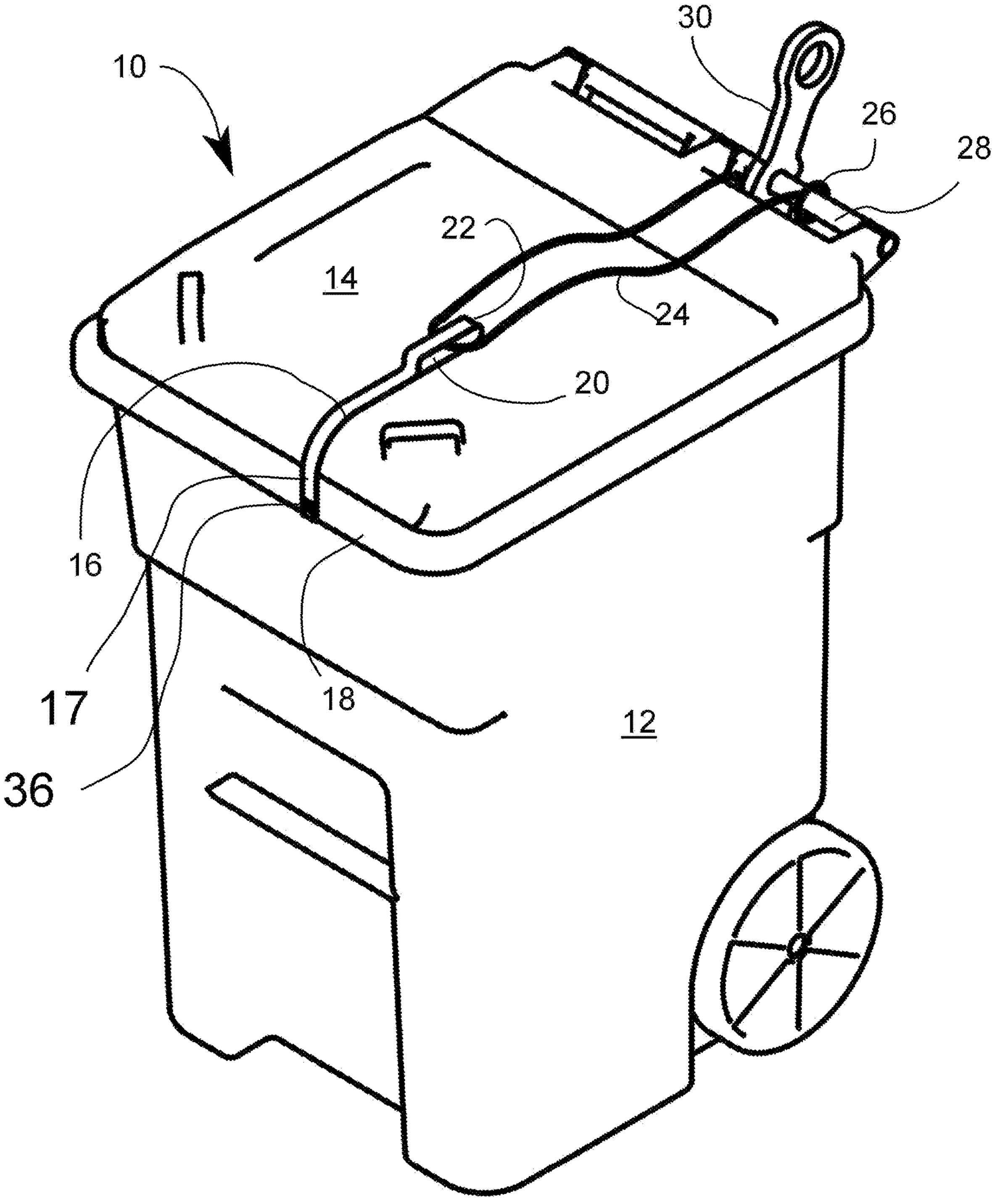
FIG. 1 is a front isometric view of a locking device for a garbage disposal bin having a flip up lid according to an embodiment of the present invention.
Figure 3A:
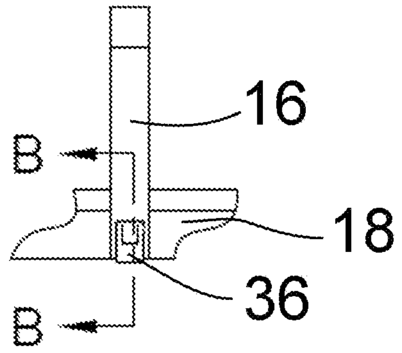
FIG. 3A is a front view of a ratcheting clip and strap for the present invention.
Figure 3B:
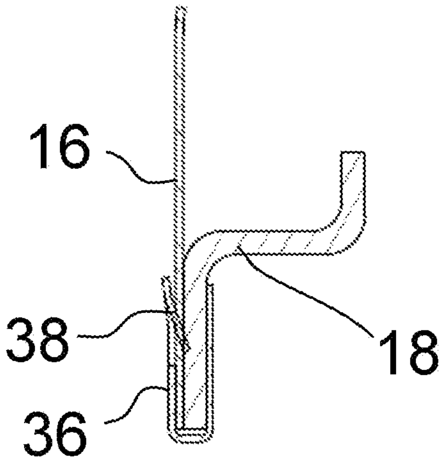
FIG. 3B is a sectional view of section B-B of FIG. 3A.

Referring now to any of the accompanying FIGS. 1-3B, a locking device 10 specifically designed for a garbage disposal bin 12 equipped with a flip-up lid 14 is illustrated. In some embodiments, the garbage disposal bin 12 is designed for the secure containment of waste as well known in the art. In one embodiment, a strap 16 is incorporated with its proximal end 17 affixed to the bin's front portion 18. A loop portion 20 is located at the distal end 22 of the strap 16, which serves as a guide for a cord 24.

In one embodiment, one end of the cord 24 is connected to a ring 26 designed to encircle a hinge portion 28, an integral part of the bin 12. From the ring 26, the cord 24 traverses the lid 14, threading through the loop portion 20, and, in certain embodiments, its opposite end can be readily detached and is secured to a pinching device or rocker lever 30.

In one embodiment, the rocker lever 30 includes an offset rotational axis 32, designed to wrap around the hinge portion 28. When the rocker lever 30 is activated, a rounded portion 34 exerts escalating pressure on the cord 24, locking it between the rounded portion 34 and the bin 12.

In various embodiments, the rocker lever 30 is constructed from a resiliently deformable material, allowing it to be twisted or stretched during installation. This flexibility ensures a fluid rotational connection with the hinge portion 28 post-installation, by way of a slit 36 in the lever.

The strap's proximal end 15 is connected to a ratcheting clip 36 in one embodiment. This ratcheting clip 36 houses a pawl 38, designed to engage with a tooth (not shown) on the strap 16. The ratcheting clip 36 is mechanically secured to the bin's front section 12 using conventional attachment techniques.

This innovative locking device 10, including the strap 16, cord 24, and rocker assembly 30, amongst other related components, offers a unique solution to secure waste containment. Specifically, the strap 16 and cord 24 system prevents the lid 14 from opening when the cord 24 is locked by the rocker lever 30. When the rocker 30 disengages the cord 24, the lid 14 can be readily opened.

In some embodiments, the strap 16 is mechanically fastened to the bin 12 using various methods. These attachment means do not interfere with the automatic and seamless lid-opening process during garbage pickup and dumping, ensuring that the locking device 10 doesn't modify the bin assembly.

The operation of this locking device 10 has several stages. Initially, users disengage the cord 24 by activating the rocker 30 towards the front of the bin 12. This action allows the cord 24 to be drawn away from the loop portion 20 and the lid 14, enabling the lid 14 to be opened. Once the lid 14 is shut, the user repositions the cord 24 atop the lid 14, threading it through the loop 20. The last stage involves the user inserting the cord's end between the bin 12 and the rocker lever's rounded portion 34. The user then pushes the rocker 30 towards the back of the bin 12. This motion effectively secures the cord 24, locking the lid 14 of the bin 12 in place.

Overall, this innovative design offers a superior solution for effective waste containment. By ensuring both bin accessibility and pest deterrent, this intuitive cord 24 and rocker 30 system provides an optimal balance for the user.

Although the invention has been described in considerable detail in language specific to structural features, it is to be understood that the invention defined in the appended claims is not necessarily limited to the specific features described. Rather, the specific features are disclosed as exemplary forms of implementing the claimed invention. In other words, the terminology and phraseology used in this description and the abstract are for illustrative purposes and should not be considered as limiting. In other words, the terminology and phraseology used in this description and the abstract are for illustrative purposes and should not be considered limiting. Therefore, while exemplary illustrative embodiments of the invention have been described, numerous variations and alternative embodiments will occur to those skilled in the art. Such variations and alternative embodiments are contemplated, and can be made without departing from the spirit and scope of the invention.

It should further be noted that throughout the entire disclosure, the labels such as left, right, front, back, top, bottom, forward, reverse, clockwise, counterclockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, references to "first," "second," "third," and so fourth members throughout the disclosure (and in particular, claims) are not used to show a serial or numerical limitation but instead are used to distinguish or identify the various members of the group.

What is claimed is:

1. A locking device for a garbage disposal bin having a flip up lid, the locking device comprising:
- a strap, said strap adapted to be attached to a front portion of the bin;
- a cord; and a rocker lever, said rocker lever adapted to be positioned near a hinge portion of the bin;
- wherein the cord is releasably attached to the rocker lever, the strap includes a loop portion through which the cord passes when positioned over the flip up lid, and the rocker lever applies pressure on the cord against a portion of the bin to secure the cord in place, thus locking the garbage disposal bin.

2. The locking device of claim 1, wherein the strap is attached to a front portion of the bin.

3. The locking device of claim 1, wherein one end of the cord is connected to a ring encircling a hinge portion of the bin.

4. A locking device for a garbage disposal bin having a flip up lid, the locking device comprising:

a strap having a proximal end adapted to be attached to a front portion of the bin and a distal end with a loop portion;

a cord having one end adapted to be connected to a ring encircling a hinge portion of the bin and the other end releasably attached to a rocker lever; and, a rocker lever with an offset rotational axis adapted to be wrapped around the hinge portion of the bin, said rocker lever capable of exerting pressure against the cord against a portion of the bin to lock the cord in place.

5. The locking device of claim 4, wherein the rocker lever is made of a resiliently deformable material, enabling the lever to be twisted or stretched during installation and to form a rotational connection with the hinge portion of the bin after installation.

6. The locking device of claim 4, wherein the proximal end of the strap is connected to a ratcheting clip with a pawl designed to engage with a tooth on the strap, and the ratcheting clip is mechanically fastened to the front portion of the bin.

7. A method for operating a locking device for a garbage disposal bin having a flip up lid, the method comprising the steps:

(a) manipulating a rocker lever towards a front of the bin to disengage a cord;

(b) pulling the cord away from a loop portion and the lid of the bin; and, (c) opening the lid of the bin.

8. The method of claim 7, further comprising the steps of:

(d) closing the lid of the bin;

(e) repositioning the cord back on top of the lid and threading it through the loop;

(f) inserting the end of the cord between the bin and the rocker lever; and, (g) pushing the rocker lever towards a back of the bin to lock the cord in place by applying pressure on the cord against a portion of the bin.

9. The method of claim 7, wherein the strap is mechanically fastened to the bin via a mechanical fastening means.

* * * * *